Aug. 2, 1960 J. R. RUHLMAN 2,947,504
CABLE SUSPENSION AND ANCHORING MEANS AND METHOD
Filed Feb. 3, 1955 3 Sheets-Sheet 1
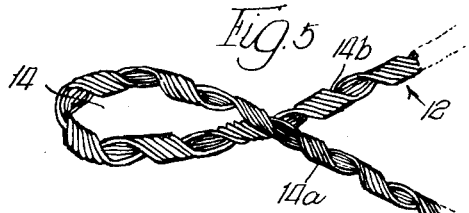
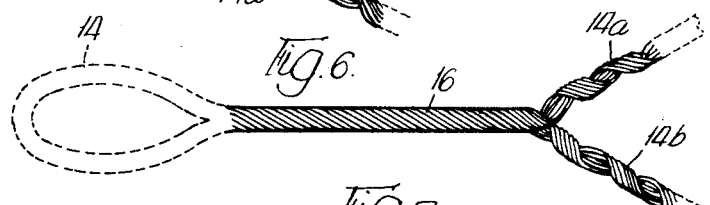
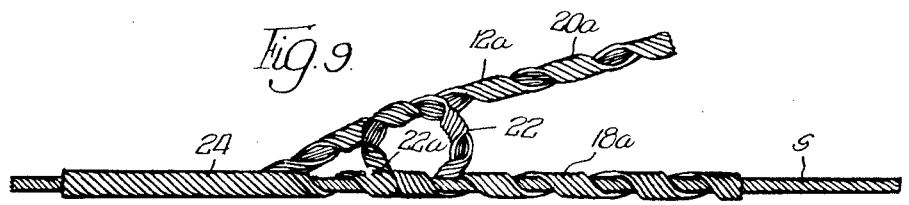
INVENTOR.
Jon R. Ruhlman,
BY
Wilkinson Huxley Byron & Jones
attys.

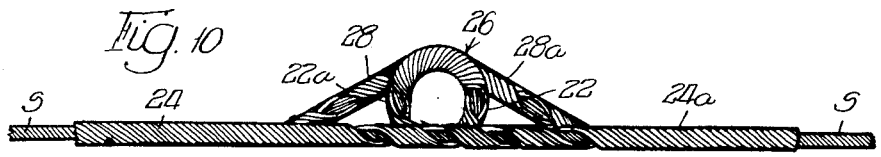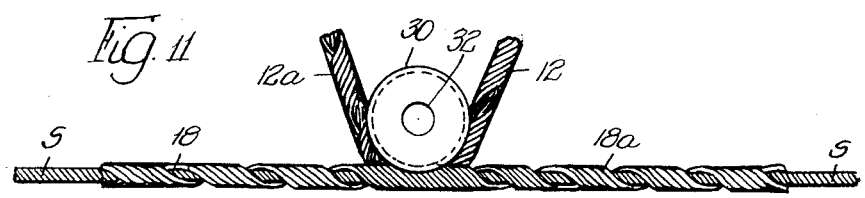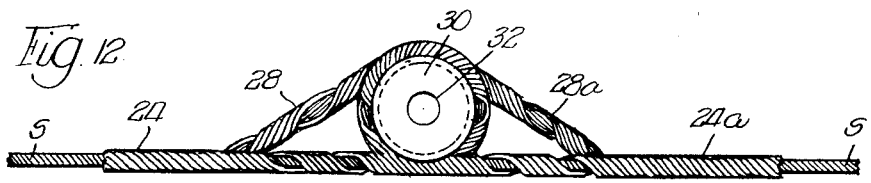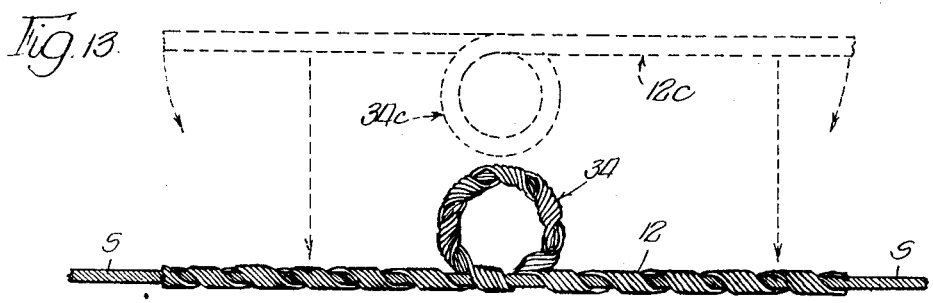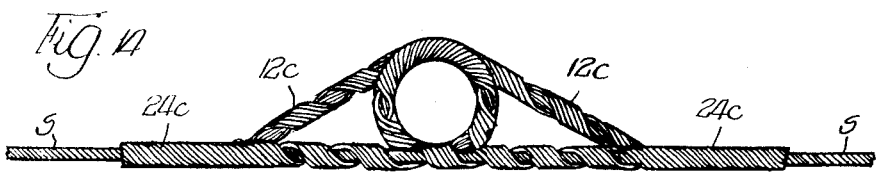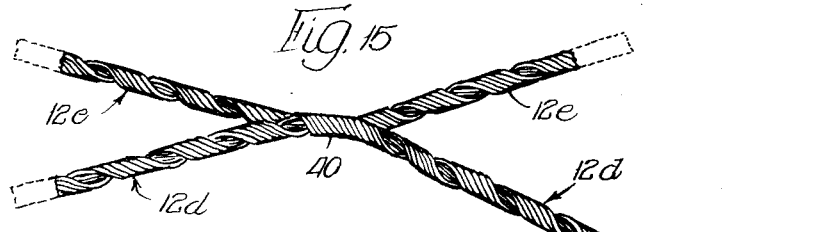

Aug. 2, 1960    J. R. RUHLMAN    2,947,504
CABLE SUSPENSION AND ANCHORING MEANS AND METHOD
Filed Feb. 3, 1955    3 Sheets-Sheet 3
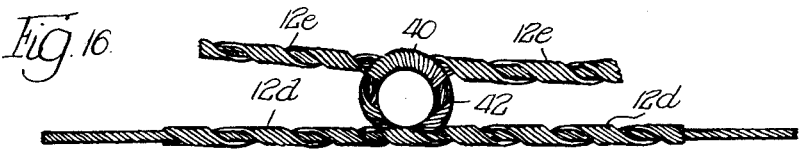
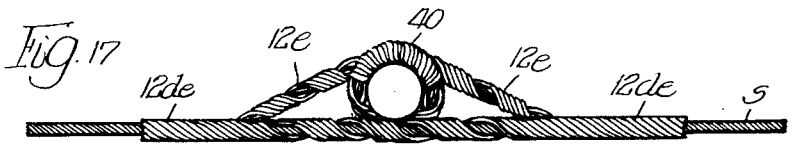
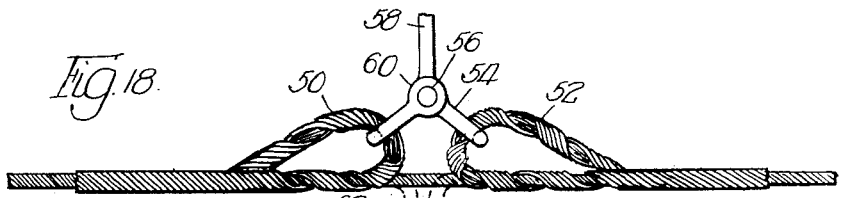
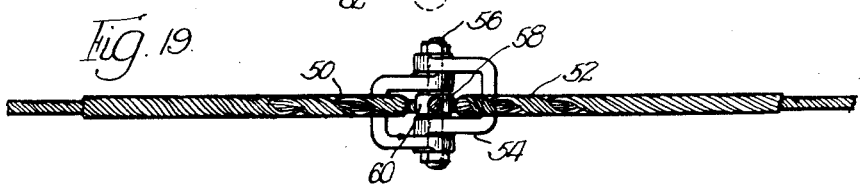
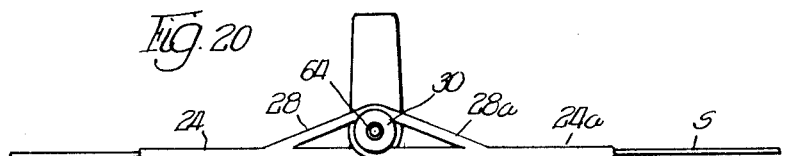
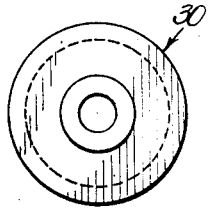
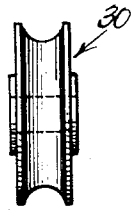
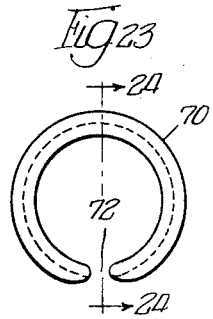
INVENTOR.
Jon R. Ruhlman,
BY
Wilkinson Huxley Byron & Hume
Attys

United States Patent Office

2,947,504
Patented Aug. 2, 1960

2,947,504

CABLE SUSPENSION AND ANCHORING MEANS AND METHOD

Jon R. Ruhlman, Cleveland, Ohio, assignor to Preformed Line Products Company, Cleveland, Ohio, a corporation of Ohio Filed Feb. 3, 1955, Ser. No. 485,883

16 Claims. (Cl. 248—63)

This invention relates to the engagement and suspension of linear bodies, such as individual wires, strands, cable, and the like (hereinafter called "strands"), and is especially concerned with the attachment of strands to supports in tangential relation to a bearing provided on the support in such a way that the strand is held in avoidance of axial displacement relative to the bearing and is reinforced to minimize bearing pressures and bending stresses.

Helically-preformed armor rods are elongated elements of appropriate strength and rigidity that are first preformed into a helix having an internal diameter that is somewhat smaller than the strand about which it is to be engaged, and which has a sufficiently open pitch so as to be wrapped around the strand from the side of the latter without exceeding the elastic limit of the material of which the armor rods are made. Groups of armor rods made and applied in this manner have been used partially or completely to enclose a strand so as to reinforce the latter at points of anchorage. They have also been used at strand ends to provide dead-ends thereon, where the armor rods are doubled back upon themselves to form a bight portion, the two branches of which are then wrapped around the end of the strand so that all components attain coaxial relationship. These so-called "dead-ends" are shown and described in the copending application of Thomas F. Peterson Serial No. 698,312, filed September 20, 1946, divided and now issued as Patent No. 2,761,273.

Although preformed armor rods have been applied to strands at supports for the purposes indicated, usually additional tying means are associated therewith to effect the actual attachment of the armored strand to the supports, relative to which the strand continues in both directions. In the case of the strand ends, the armor rods themselves constitute the means of attachment to an anchorage by virtue of the bight or eye thus formed upon the strand's end for dead-ending purposes.

The present invention is directed to the application of helically-preformed elements otherwise arranged as deadends, but at a mid-strand position for gripping and supporting the strand while, at the same time, providing an offside bearing-engaging loop that is effective to secure the strand thereto without additional tying or clamping means. As so applied, the dead-ends serve to cradle the strand in a firm but gentle manner and to permit the tensile load on the strand to be borne and transmitted by itself past the bearing or neutral bracket without being communicated to the support, unless unbalanced, as by strand failure, at one side of the support. In this way, the strand may pass the point of bearing in substantially tangential relation to the latter without recourse to the anchoring practice sometimes invoked, in which, by means of dead-ends, strands at supports are attached to the latter upon neutral brackets around which the strand is by-passed in a slack loop. This is the equivalent of dead-ending a strand in both directions from the support in which the dead-end members transmit the tensile load of the strand to the support, while the strand itself is relieved thereof.

The various objects and advantages of the present invention, as discussed above and as will be developed hereinafter, will be more clearly understood by reference to the attached drawings, in which—

Figures 1 and 2 are side elevational and end views, respectively, of a helically-preformed armor rod characteristic of those employed in the present invention;

Figures 3 and 4 are side elevational and end views of a plurality of helically-preformed armor rods similar to those shown in Figures 1 and 2;

Figure 5 is a fragmentary view of a set of helically-preformed armor rods, similar to those shown in Figure 3, that is bent intermediate its ends to form a bight portion and having its legs crossed and extending away therefrom;

Figure 6 shows the arrangement of Figure 5, in which the crossed legs have been intertwisted to form a tubular body portion;

Figures 7, 8 and 9 are side elevational views of the manner in which sets of armor rods as shown in Figure 5 are applied to a strand to be suspended in accordance with the present invention;

Figure 10 is a corresponding view showing the installation completed in accordance with the foregoing figures;

Figures 11 to 17 are corresponding views setting forth certain modifications of the invention;

Figures 18 and 19 are further modifications thereof, showing the use of a clevis in the suspension of the strand;

Figure 20 is a fragmentary elevational view of pole to which a strand is attached in accordance with the present invention;

Figures 21 and 22 are front and side elevational views, respectively, of a mounting bearing or sheave employed in the present invention; and Figures 23 and 24 are front elevational and mid-sectional views, respectively, of a modified form of bearing for use in connection with the present invention, Figure 24 representing a section taken on line 24—24 of Figure 23.

Referring more particularly to the drawings, Figures 1 to 6 show the individual armor rod as preformed, and the manner in which two or more of such helically-preformed armor rods 10 are assembled into half-sets 12 for application in straight line disposition to strands for reinforcing and armoring the latter, in accordance with the prior teachings of Thomas F. Peterson. In Figure 5 a bight portion 14 is formed by bending the rods intermediate their ends from which branches or legs 14a and 14b extend. These branches or legs are adapted to be intertwisted to form a tubular body 16 upon the bight portion 14, in which, in accordance with the above-identified application of Thomas F. Peterson, it is customary to enclose the end of the strand to be dead-ended.

To a certain extent, this same practice is followed in carrying out the techniques of the present invention, as illustrated in the ensuing figures. Thus in Figure 7 there is disclosed a strand S to be suspended, to which a set of helically-preformed armor rods 12 have been applied for a portion 18 of their extent in surrounding relation to the strand. The set of armor rods is doubled back as shown in Figure 7 to form an unattached portion 20 that is complementary to the attached portion 18 already in place around the strand.

As appears in Figure 8, the portion 20 is directed downwardly to the strand and is intertwisted between the turns of the portion 18 already in position, so as to form a closed bight portion 22 to one side of the strand and a reinforcing and holding closure 24 enveloping the strand to one side of the bight.

As appears in Figure 9, another set of armor rods 12a of the same helical characteristics as just described is applied to the strand in the same manner, so that its bight portion 22a overlaps the bight portion 22 of the set of armor rods already installed thereon, as shown in Figure 8, and so that the portions 18a and 20a when combined as shown in Figure 10 to comprise the closure 24a which surrounds the strand and extends in the opposite direction from the closure 24 along the latter.

As best appears in Figure 10, this affords an arrangement in which the bight portions cooperate to form an enclosed eye 26 having chord members 28 and 28a, which extend from the top of the eye diagonally downwardly to the strand, where they cooperate with the attached portions to form the reinforcing closures 24 and 24a, respectively. These latter may extend along the strand for as great a distance from the eye as is necessary to afford the requisite reinforcement and support of the strand. The eye is used for engaging a bearing upon a support similar to that shown in Figure 20.

Where it is desired to include a bearing or sheave as the attaching and suspending means, a procedure similar to that illustrated in Figures 11 and 12 may be followed. In this instance, the half-sets of armor rods 12 and 12a are installed upon the strand S at their portions 18 and 18a, so that their free ends are crossed and project outwardly of the strand from a common meeting point. A sheave 30, similar to that shown in Figures 21 and 22, is disposed between the free ends of the predisposed sets of armor rods, which are then respectively wrapped around the sheave in opposite directions, and thence downwardly into enveloping relation with the strand in complementary position to their installed parts. The sheave is provided with a central aperture 32, through which a spike, lag screw, or other suitable fastening, may be disposed for the attachment of the latter to its support, such as a wooden post.

In Figures 13 and 14, there is shown a modification of the foregoing, in that one set of armor rods 12 is disposed on the strand S with a looped portion 34 intermediate its ends, which is made by a 360° continuous bend of the set of armor rods during its installation. Another set of armor rods 12c, similarly looped as at 34c, is lowered into position until the loops 34 and 34c are in axial alignment transversely of the strand, whereupon the free ends of the looped set 12c are then directed diagonally downwardly across the strand, and are wrapped therearound to complement the set of preformed armor rods already in place thereon. This results in a construction similar to that shown in Figure 14.

In Figure 15 there is shown another embodiment of the invention in that two sets of helically-preformed armor rods 12d and 12e are crossed intermediate their ends and are twisted together as at 40 for one or two pitch lengths. The depending legs of the set 12d are then bent toward each other and crossed, and become affixed to the strand in crossed relation, as appears in Figure 16, forming an intermediate loop 42, which has the portion 40, at which the set of armor rods 12e is engaged therewith, at its top, and from which the legs of the latter extend in spaced relation to one side of the strand. These are then directed downwardly as shown in Figure 17, and are wrapped around the strand in complementary relation to the armor rods 12d already in place upon the strand, to form a completed organization, as shown in Figure 17.

In Figure 18, a pair of dead-ends 50 and 52 are respectively installed on the line individually, as was described in connection with Figure 8, but in spaced relation, so that their bight portions do not overlap. A pair of clevises 54 are disposed through the eyes of the bight portions, and connected together by nut and bolt assembly 56. A hanger bar 58, having a suitably aligned bolt bearing 60, may be first disposed between the clevises and impaled upon the bolt passing between them. This arrangement can permit a loop to be formed in the strand as is indicated in broken lines at 62 in Figure 18, or can permit two strands to be suspended so that the ends can lead downwardly, in lieu of the looped portion 62, as drop wires or taps.

In Figure 20 there is shown a pole P, in relation to which the strand S extends in crossed relation substantially tangent to the sheave 30 which is fastened to the pole, preferably by a driven fastening 64. The helically-preformed armor rods assembled in any of the ways described above in connection with Figures 7 to 17, inclusive, are engaged around the sheave to provide cable reinforcing and sustaining portions 24 and 24a, and diagonal chord members 28 and 28a, which firmly secure the cable against accidental movement, while minimizing bending and vibrational stresses in the cable.

In Figures 23 and 24 there is represented an interrupted ring or thimble 70, which may be substituted for the sheave 30 in any of the foregoing constructions, and which by virtue of its opening 72 may be compressed and sprung into a previously assembled suspensory similar to that shown in Figures 10, 14 and 17.

It is, of course, understood that the internal diameter of the helices to which the armor rods are preformed in all of these embodiments is preferably somewhat smaller than the external diameter of the strand S, in order that the latter may be firmly gripped by the armor rods so as to preclude axial movement between them. It will also be apparent that the armor rods mutually conform to each other as to size of stock, helical diameter and pitch length, the latter being sufficiently long to permit of side application of the rods to the strand without permanent deformation as is mentioned above.

Also, in forming the bight portions, it is preferable that one of the sets of preformed helices lies within the helical opening of the other to form the eye, whereby most of the elements lie within the parallel vertical planes that are tangent to the eye and to the outside diameter of the armored strand.

I claim:

1. A strand suspensory comprising, in combination with a strand to be suspended, a first helically-preformed, relatively elastic strand-conforming element of open pitch so as to be applied to said strand, said element being doubled back upon itself to constitute two leg portions terminating in a bight portion intermediate its ends, the leg portions of said element being wrapped around said strand in coaxial relation to each other, said bight portion lying to one side of said strand; and a second preformed element similar to said first element having a bight portion overlapping the bight portion of said first element, and having its leg portions wrapped around said strand similarly to said first element but extending in the opposite direction along said strand from said bight portions to that in which the leg portions of said first element extend.

2. A strand suspensory comprising, in combination, a strand to be suspended, a first helically-preformed relatively elastic element and a second helically-preformed relatively elastic element, said elements being mutually conforming and of open pitch to surround and grip said strand, said first element having a closed loop intermediate its ends and having its opposite ends crossed at the loop and wrapped around said strand so as to extend therealong in opposite directions from said loop, said second element being similarly looped and wrapped around said strand in coaxial relation to the ends of the first element, the loops of said first and second elements being substantially concentric with respect to a common axis.

3. The invention of claim 2, in which said elements are joined at their loop portions by being intertwisted to dispose coextensive portions thereof about a common helical axis.

4. The invention of claim 2, in which said second element and its intermediate loop are inverted with respect to said first element and loop, the ends of said second element extending from said loops at points thereof remote from said strand diagonally to said strand to constitute chord members at each side of said loops.

5. The invention of claim 1, in which said overlapped loop portions are formed around a central bearing member, said member having means for engagement with extraneous attachment means.

6. The invention of claim 4, in which said overlapped loop portions are formed around a central bearing member, said member having means for engagement with extraneous attachment means.

7. The strand suspension system that includes the combination of a support, an annular bearing affixed to said support, a strand passing proximately to said bearing in substantially tangential relation thereto, a helically-preformed element circumjacent said strand and having a portion intermediate its ends looped around said bearing, a second helically-preformed element circumjacent said strand and looped intermediate its ends around said bearing, portions of said elements at each side of said bearing extending along said strand for a substantial distance to reinforce the latter.

8. The invention of claim 1, in which the bight portions of the two elements, instead of being overlapped, are spaced apart axially of the strand, and means engaged through both of said bight portions for suspending said strand.

9. The invention of claim 8, said bight-engaging suspension means comprising a pair of clevises, each disposed, respectively, through one of said bight portions, said clevices having pin bearings at their open ends, said pin bearings being aligned transversely of said strand, and a pin passing through said bearings to secure them together.

10. The invention of claim 9, a hanger arm having a pin bearing at its lower end, said pin passing through said pin bearing on said arm at a position between the opposed pairs of clevis bearings.

11. The method of suspending strands which includes engaging a strand with a first helically-preformed element wound about the strand so as to be coextensive therewith for a substantial portion of the length of said element, applying a second preformed element similar to the first element so as to extend along the strand starting from a point in the strand contiguous to the installed portion of said first element, and so that the unapplied free portions of both elements cross each other and extend in opposite directions adjacent the strand, doubling each element back upon itself to form mutually interengaged bight portions which complement each other to constitute a closed eye, leading each of the free portions of said elements, respectively, upon opposite sides of said eye toward said strand as diagonal chord members, wrapping the free ends of said chord members around the strand between the helical windings of their respective first installed parts, and engaging said eye with an extraneous supporting device.

12. The method of claim 11, further including the step of inserting an annular bearing member at the crossed portions of said elements before the bights are formed therein, and then forming said bights around the bearing member to enclose it in said eye for attachment to the extraneous supporting device.

13. The method of forming a holding means and a reinforcement upon a strand which includes engaging the strand with a plurality of helically-preformed elements for a limited portion of its length, forming certain of said elements into a loop intermediate their ends to stand out from said strand so that the major planar dimension of the loop lies in a plane of the longitudinal axis of said strand, and extending certain of said elements from the outermost portions of said loop to the strand as diagonal chord members lying within said plane.

14. The method of forming a holding means and a reinforcement upon a strand which includes arranging a pair of helically-preformed elements into mutually intertwisted relation for one or more helical pitch lengths adjacent the middle portion of each so that four legs project from the connected portion, taking two legs belonging to the same element and crossing them, applying the crossed legs to the strand by wrapping them around it, and then leading the legs of the remaining element to the strand in diagonal paths and wrapping them about the strand between the helical courses of the legs of the other element aready installed thereon.

15. A strand suspensory comprising, in combination, a strand to be suspended, a first helically-preformed element and a second helically-preformed element comprised, respectively, of a plurality of wire helices mutually conformed to a uniform open pitch and internal diameter so as to be applied to surround and grip said strand, said elements being looped intermediate their ends to define at least one bight with helical legs extending therefrom, said helical legs being wrapped around said strand so as to extend along the latter in gripping relation therewith, said elements presenting said bight to the side of the strand, and suspending means engaging the bight of said elements for fixing the latter with respect to an extraneous support.

16. The method of suspending strands which includes helically preforming wire elements to a common helical diameter, open pitch length, and hand of lay; assembling said elements into mutually conforming groups; bending two groups of said elements adjacent their middle to constitute each into a bight portion with two legs extending therefrom; applying one group to a strand to be suspended by wrapping the helical legs in complementary fashion around the strand with the bight portion projecting to one side thereof; overlapping said bight portion with the bight portion of the second group, and proceeding to wrap the legs of the latter around the strand in a direction extending oppositely along the strand to the legs of the first group.

References Cited in the file of this patent

UNITED STATES PATENTS

| | | |
|---|---|---|
| 2,182,342 | Karitzki | Dec. 5, 1939 |
| 2,202,538 | Selquist | May 28, 1940 |
| 2,234,656 | Schmalz | Mar. 11, 1941 |
| 2,242,341 | Brignall | May 20, 1941 |
| 2,275,019 | Peterson | Mar. 3, 1942 |
| 2,421,286 | Pyle | May 27, 1947 |
| 2,476,731 | Hobbs | July 19, 1949 |